United States Patent
Mihara et al.

[11] Patent Number: 6,088,059
[45] Date of Patent: Jul. 11, 2000

[54] ELECTRONIC IMAGING APPARATUS HAVING IMAGE QUALITY-IMPROVING MEANS

[75] Inventors: Shinichi Mihara, Tama; Osamu Inagaki, Hachioji; Gakuji Kamishima, Hino; Atsuo Goto, Hachioji, all of Japan

[73] Assignee: Olympus Optical Co., Ltd., Tokyo, Japan

[21] Appl. No.: 08/780,139

[22] Filed: Dec. 26, 1996

[30] Foreign Application Priority Data

Dec. 26, 1995 [JP] Japan .................................... 7-338950
Nov. 28, 1996 [JP] Japan .................................... 8-316821

[51] Int. Cl.⁷ .................................................. H04N 5/225
[52] U.S. Cl. ............................ 348/335; 348/342; 348/241
[58] Field of Search .................................... 348/335, 336, 348/337, 338, 340, 342, 344, 345, 241

[56] References Cited

U.S. PATENT DOCUMENTS

| | | | |
|---|---|---|---|
| 5,349,474 | 9/1994 | Shimizu et al. | 359/675 |
| 5,495,429 | 2/1996 | Craven et al. | 364/526 |
| 5,555,479 | 9/1996 | Nakagiri | 359/355 |
| 5,568,197 | 10/1996 | Hamano | 348/342 |
| 5,748,372 | 5/1998 | Kitagawa | 359/565 |
| 5,774,279 | 6/1998 | Kiriki et al. | 359/753 |
| 5,841,586 | 11/1998 | Nagaoka | 359/654 |
| 5,883,744 | 3/1999 | Maruyama | 359/565 |

FOREIGN PATENT DOCUMENTS

| | | |
|---|---|---|
| 4-12312 | 1/1992 | Japan . |
| 4-13378 | 1/1992 | Japan . |
| 4-175737 | 6/1992 | Japan . |
| 5-45521 | 2/1993 | Japan . |
| 6-324262 | 11/1994 | Japan . |

Primary Examiner—Wendy Garber
Assistant Examiner—Jacqueline Wilson
Attorney, Agent, or Firm—Pillsbury Madison & Sutro LLP

[57] ABSTRACT

An electronic imaging apparatus capable of obtaining high image quality that serves for printed photographs, e.g. DTP and posters. The apparatus has an image-forming optical system (1), a solid-state image pickup device (3), a signal processing device (4), and a sensor driving circuit (5). The image-forming optical system (1) includes a diffraction lens for correcting chromatic aberrations. The signal processing device (4) includes an image processing device for removing flare components due to unwanted orders of diffracted light produced by a diffraction surface. The image processing device obtains a flare component by performing the convolution of the point image energy intensity distribution of each unwanted order of diffracted light with the energy intensity distribution of an image signal, and subtracts the flare component from the image signal to obtain a corrected image signal.

35 Claims, 12 Drawing Sheets

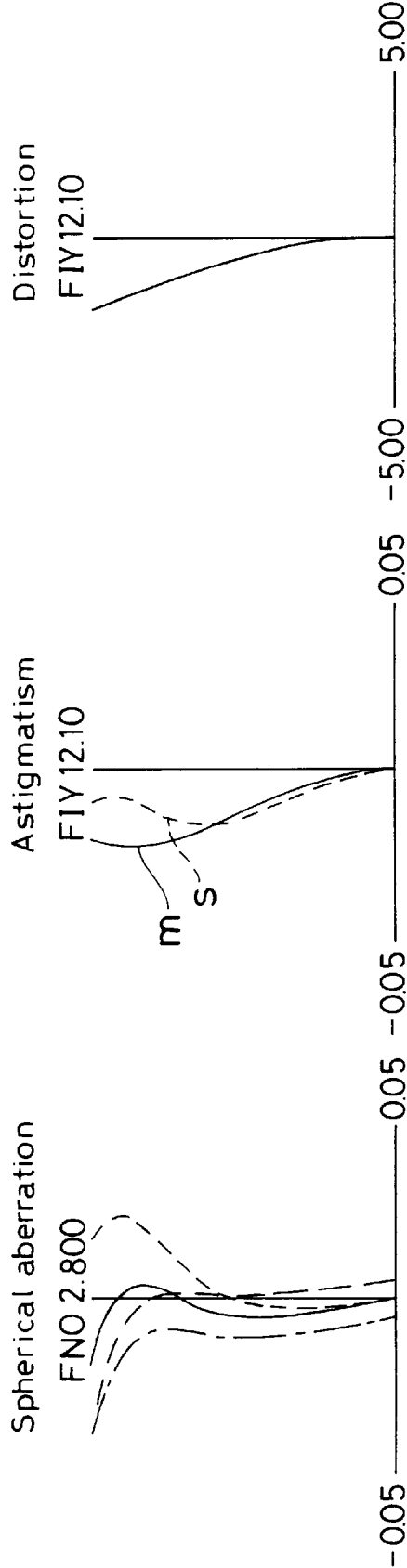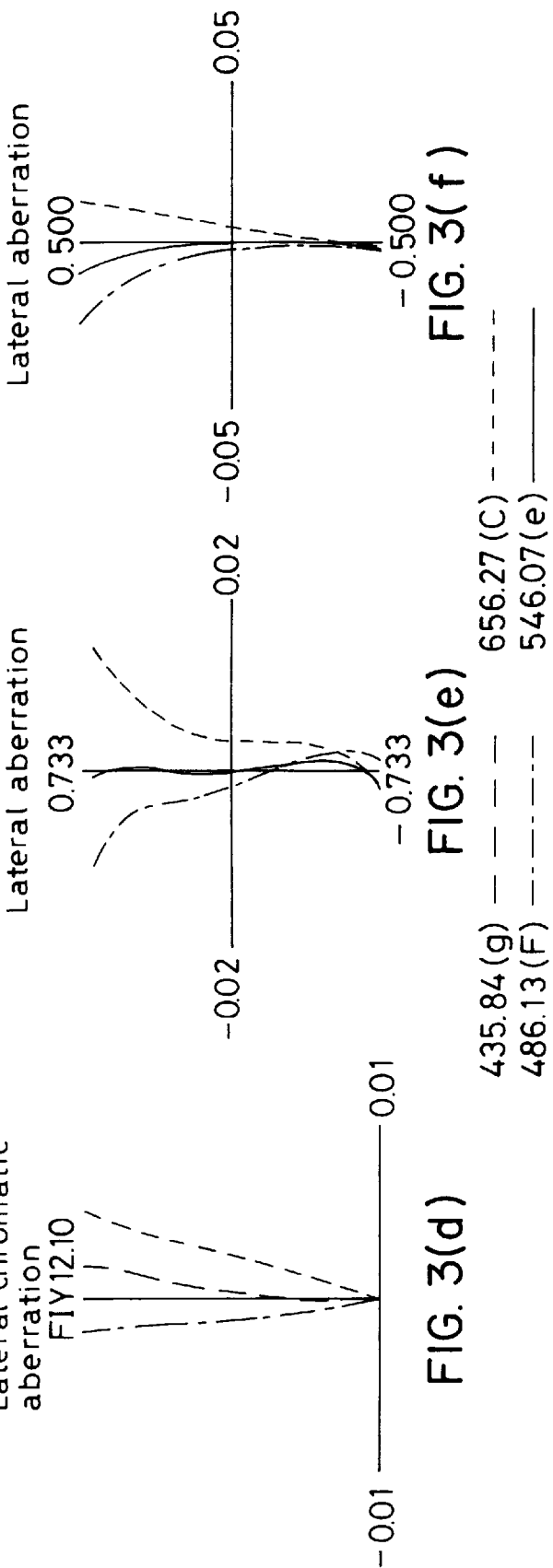

FIG. 5
First-order
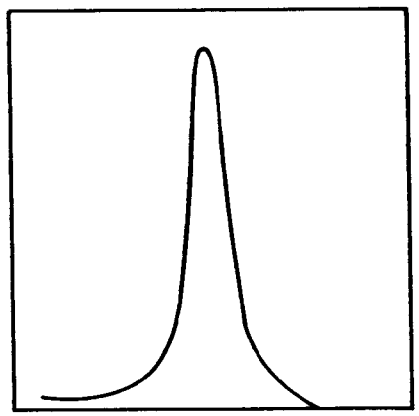
Second-order
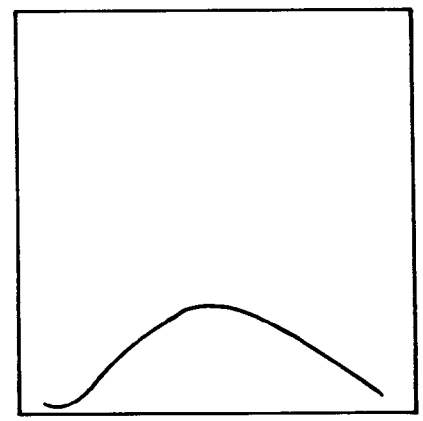
Zero-order
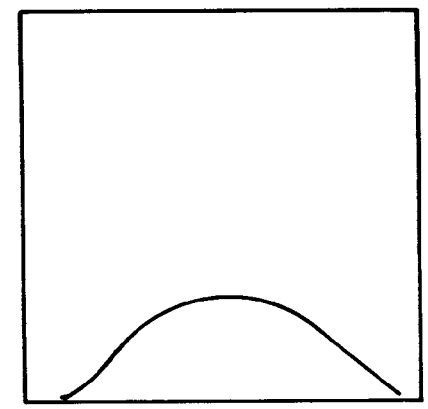

ELECTRONIC IMAGING APPARATUS HAVING IMAGE QUALITY-IMPROVING MEANS

BACKGROUND OF THE INVENTION

1. Field of the Invention

The present invention relates to an electronic imaging apparatus particularly suitable for obtaining high-definition images.

2. Discussion of Related Art

Electronic imaging apparatuses, including electronic cameras, were limited in image quality by the number of pixels of an electronic image pickup device used. Recently, however, the number of pixels of each electronic image pickup device has been rapidly increasing to such a level that it is possible to expect image quality equal to or higher than that of silver halide photographs. On the other hand, the effective imaging area of electronic image pickup devices is smaller than that of silver halide films. Therefore, there is a demand for an image-forming optical system that shows a high frequency response at a high spatial frequency. However, it is difficult to meet the demand because of the marked degradation of the response due to geometrical-optical factors such as aberrations, and manufacturing errors (e.g. decentration, tolerances, and surface accuracy), together with wave-optical factors such as the influence of diffraction as well as an optical low-pass filter. Further, if there is residual chromatic aberration (secondary spectrum), the loss of color definition is likely to become conspicuous at the edge of a pattern in terms of dynamic range and color saturation. In particular, the influence of secondary spectrum is large; therefore, a vitreous material of high anomalous dispersion must be used a great deal, resulting in a substantial rise in cost. In the case of old cameras for business use (e.g. TV cameras), which had three camera tubes, it was possible to cancel the residual axial chromatic aberrations and lateral chromatic aberrations to a certain extent. However, with the change of image pickup devices from camera tubes to solid-state image pickup devices, it has become impossible to cancel lateral chromatic aberrations. With the change of cameras from three-tube or -chip type cameras to single-chip mosaic filter type cameras, it has become impossible to cancel axial chromatic aberrations. Therefore, it is even more strongly demanded to correct chromatic aberrations remaining in optical systems. Thus, there is an increasing need of removing the residual chromatic aberrations from optical systems in the present state of the art.

The relationship among the focal length fL and field angle $2\omega$ of an image-forming optical system of an electronic imaging apparatus and the number of pixels and pixel pitch (distance between the centers of adjacent pixels) of an image pickup device may be approximately given by $$fL \cdot \tan\omega = \text{diagonal image height} = \text{pixel pitch} \times (2 \times \text{number of pixels})^{1/2} \quad (1)$$

It is desirable in order to correct aberration a in the image-forming optical system to satisfy the following condition:

$$fL \cdot a < \text{pixel pitch} \times 2 \quad (2)$$

Substituting equation (1) into equation (2) and changing the expression gives $$a < \tan\omega/(2 \times \text{number of pixels})^{1/2} \quad (3)$$

It should be noted that in the above expressions, a is axial chromatic aberration or lateral chromatic aberration when fL is set equal to 1 (fL=1) at a certain F-number.

As will be understood from the above, the target chromatic aberration is seemingly dependent only on the number of pixels. However, as the pixel pitch decreases, the influence of various response-reducing factors becomes remarkable, as stated above. Therefore, when an optical system is designed, the target aberration a must be made smaller. Under these circumstances, attention has recently been paid to diffraction optical elements that exhibit optically superior correcting capability for higher-order spectra in particular, and studies have been conducted to put diffraction optical elements to practical use. In the meantime, diffraction optical elements have a problem which is difficult to resolve. The problem is that, when it is intended to obtain a specific order of diffracted light over a wavelength width needed for an electronic imaging apparatus, other orders of diffracted light unavoidably get mixed in the desired order of diffracted light. The undesirably mixed diffracted light is referred to as "unwanted orders of diffracted light", which cause flare and degrade image quality.

SUMMARY OF THE INVENTION

An object of the present invention is to provide an electronic imaging apparatus capable of obtaining high image quality that serves for printed photographs, e.g. DTP (desktop publishing) and posters.

Basically, the electronic imaging apparatus according to the present invention has an image-forming optical system for forming an image of an object; an electronic image pickup device for converting the image formed by the image-forming optical system into an electric signal representing the image; and a signal processing device for converting the signal obtained by the electronic image pickup device into an image signal which can be displayed on an output device, e.g. a display unit, or which can be stored in a storage unit, e.g. a VTR or a digital memory. The image-forming optical system includes a diffraction surface, and the signal processing device includes an image processing device for improving image quality.

When compared to refracting optical elements, diffraction optical elements have equivalent dispersion exhibiting an extremely high negative value. In regard to the equivalent partial dispersion ratio also, diffraction optical elements differ greatly from refracting optical elements. Introducing a diffraction optical element into an image-forming optical system makes it possible to favorably correct the residual chromatic aberration due to higher-order spectra in the image-forming optical system. When such a diffraction surface is employed, flare components due to unwanted orders of diffracted light are produced. According to the present invention, however, the flare components are removed by providing an image processing device for improving image quality.

More specifically, the light intensity distribution at one point in the object image formed by the image-forming optical system including a diffraction surface as employed in the present invention involves the contribution of each order of diffracted light produced at the diffraction surface. Of the various orders of diffracted light, only a predetermined order of diffracted light (in many cases, first-order diffracted light is used) contributes to the proper image formation, and the other orders of light form flare components. The basic idea of the present invention is to remove the flare components by image processing.

When one point source of light is imaged as an object image on the electronic image pickup device by the image-forming optical system, the object image is formed as an image having an area, not a complete point, owing to the influence of aberrations in the image-forming optical system and other factors. The point image formed by the image-forming optical system is a superposition of point images formed of various orders of diffracted light. Although the point image cannot be separated into components of respective orders, it is possible to obtain information concerning the order-by-order details of diffracted light contributing to the formation of the point image from the design data about the image-forming optical system. Therefore, the light intensity distribution over the image field is simulated for each order of diffraction by making use of the details of diffracted light, thereby obtaining energy intensity distributions due to components of unwanted orders of diffraction other than a predetermined order of light, and components corresponding to the energy intensity distributions are subtracted from the image signal, thereby separating and removing flare components.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

BRIEF DESCRIPTION OF THE DRAWINGS

FIGS. 3(a)–3(f) are aberrational diagram illustrating aberrations in the image-forming optical system shown in FIG. 2A.

FIG. 5 shows the energy intensity distribution about the image of a point source for each order of diffracted light.

DESCRIPTION OF THE PREFERRED EMBODIMENTS

A first embodiment of the present invention will be described.

Figure 1:
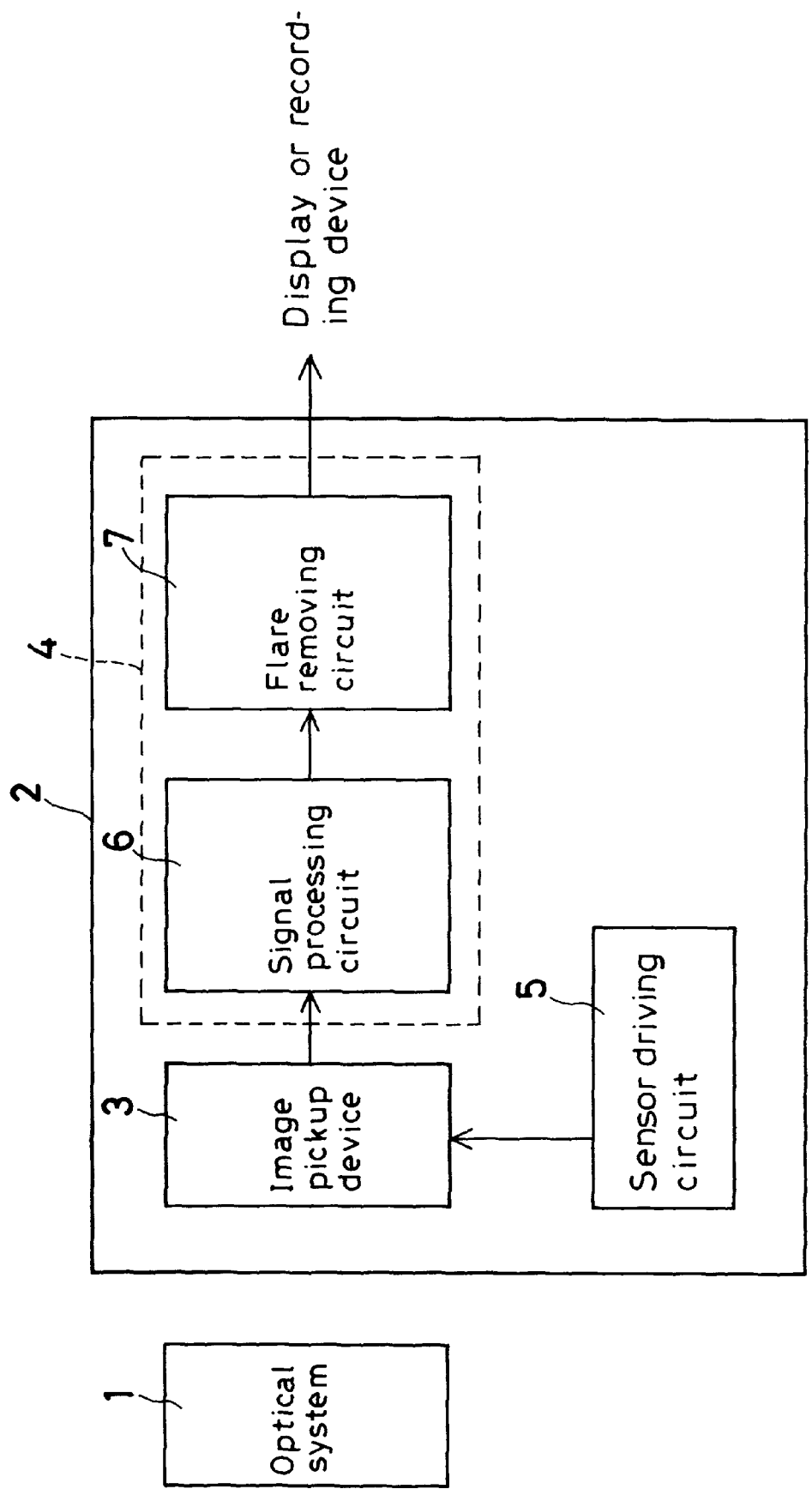
FIG. 1 is a block diagram showing the whole arrangement of a first embodiment of the present invention.

FIG. 1 is a block diagram showing the whole arrangement of the first embodiment. In the figure, reference numeral 1 denotes an image-forming optical system. A camera section 2 contains a solid-state image pickup device 3, a signal processing device 4, and a sensor driving circuit 5. The signal processing device 4 has a signal processing circuit 6 and a flare removing circuit 7. An image of an object (not shown) to be photographed is formed on a light-receiving surface of the solid-state image pickup device 3 through the image-forming optical system 1. The solid-state image pickup device 3 outputs an electric signal representing the object image, and the electric signal is supplied to the signal processing circuit 6. The signal processing circuit 6 includes a known image processor, A/D converter, digital signal processing circuit, etc. The signal processing circuit 6 displays the output signal from the solid-state image pickup device 3 on a display unit in the subsequent stage. Alternatively, the signal processing circuit 6 converts the output signal from the solid-state image pickup device 3 into an image signal recordable on a recording device, e.g. RGB component signals. The flare removing circuit 7 removes harmful signal components from the image signal to improve image quality. It should be noted that the sensor driving circuit 5 controls image storing and reading operations by driving the solid-state image pickup device 3.

First, the image-forming optical system 1 will be described in detail.

FIG. 2A shows a specific arrangement of the image-forming optical system 1. The illustrated optical system has an image-forming lens system 10; a filter group 11 including an infrared cutoff filter, an optical low-pass filter, etc., which is disposed on the exit side of the image-forming lens system 10; and a prism 12. Reference numeral 13 indicates the position of the light-receiving surface of the solid-state image pickup device 3. The image-forming lens system 10 has a stop 14; a front lens unit 15 of positive power disposed in front of the stop 14; and a rear lens unit 16 of positive power disposed behind the stop 14. The front lens unit 15 includes, in order from the light entrance side thereof, positive lenses Li and L2 and negative lenses L3 and L4. The rear lens unit 16 includes, in order from the light entrance side thereof, a negative lens L5, positive lenses L6 and L7, a negative lens L8, a positive lens L9, and a diffraction optical element L10. The feature of the image-forming lens system 10 resides in that the rear lens unit 16, which lies on the image side of the stop 14, includes the negative lenses L5 and L8 and the diffraction optical element L10.

Generally, in electronic imaging apparatuses, the effective image field size of electronic image pickup devices is smaller than that of imaging apparatuses of other formats such as silver halide film, and in many electronic imaging apparatuses, a filter, a prism, etc. are inserted between an image-forming lens and an image pickup device. Accordingly, the ratio of the back focus of the image-forming lens to the focal length is high. Further, because of the necessity of reducing the exit angle of extra-axial principal rays from the lens system (i.e. the incident angle of the extra-axial principal rays to the image pickup device), the lens unit on the image side of the stop in the lens system tends to have the major part of the overall positive power in the lens system. Therefore, a negative lens is disposed in the rear lens unit 16 to correct various aberrations produced in the rear lens unit 16.

It is desirable for a negative lens used in the rear lens unit 16 to have a relatively strong power that satisfies the following condition:

$$0.1 < -fN/fL < 2 \quad (4)$$

where fN is the focal length of the negative lens, and fL is the focal length of the entire image-forming lens system.

The extra-axial ray height in the rear lens unit 16 is also high.

The above-described negative lens uses a dense flint glass vitreous material of high dispersion to correct first-order chromatic aberration. This vitreous material has a relative partial dispersion that assumes a slightly greater positive value than that of other vitreous materials. Therefore, the axial chromatic aberration draws a locus which is convex toward the object side from a shorter wavelength to a longer wavelength, and the lateral chromatic aberration at a certain image height draws a locus which is convex toward the optical axis. Accordingly, if a diffraction surface having a relatively weak positive power is disposed on the same side as the above-described negative lens with respect to the stop in the image-forming optical system, it becomes possible to correct the secondary spectrum, which has heretofore been impossible to correct by a combination of existing optical glass materials. The reason for this is that the equivalent dispersion of the diffraction optical element has an extremely high negative value, and the equivalent relative partial dispersion thereof has a smaller positive value than that of ordinary glass. In this lens system, a diffraction surface is formed on the exit surface of the lens L10. It is desirable for the focal length fDOE of the above-described diffraction surface to satisfy the following condition:

$$fL/fDOE < 0.07 \qquad (5)$$

In the above expression, fDOE expresses the focal length attributed only to the diffracting action of the diffraction surface. In a case where a diffraction grating is formed on a curved surface of a refracting lens, for example, fDOE is equivalent to the reciprocal of a value determined by subtracting a power attributed to the curvature of the surface of the refracting lens from the overall power of the diffraction surface.

If the focal length fDOE of the diffraction surface does not satisfy the above condition (5), i.e. if fL/fDOE is not smaller than 0.07, the secondary spectrum is likely to be overcorrected. Particularly, the lateral chromatic aberration of the outermost extra-axial ray bundle is likely to become large in the opposite direction to that in normal cases.

Figure 2:
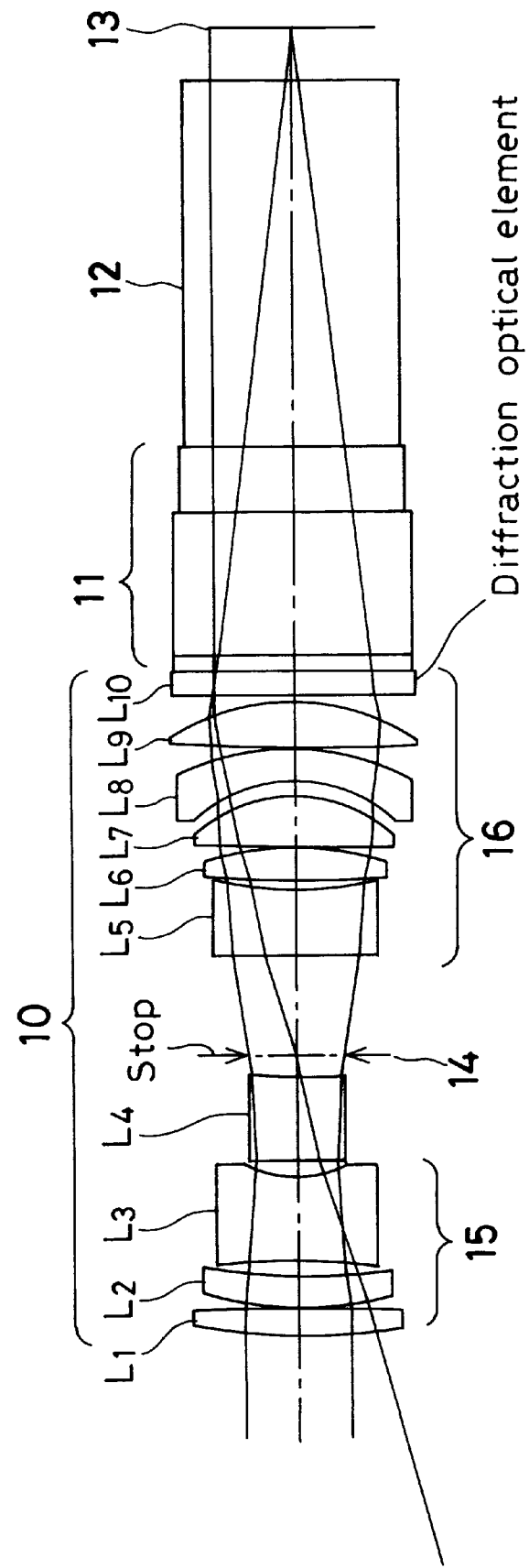
FIG. 2A is a sectional view of an image-forming optical system in the first embodiment of the present invention.
FIG. 2B is a schematic illustration of an embodiment of a diffraction optical element.

The image-forming optical system shown in FIG. 2 uses first-order diffracted light produced by the diffraction surface as light that contributes to the proper image formation. Design data about the image-forming optical system is as follows:

| fL = 45 | F-number = 2.8 | Image Height = 10.6 | |
|---|---|---|---|
| $r_1$ = 78.5680 | | | |
| | $d_1$ = 9.5712 | $n_1$ = 1.80401 | $v_1$ = 42.24 |
| $r_2$ = −2114.4267 | | | |
| | $d_2$ = 0.15 | | |
| $r_3$ = 113.6029 | | | |
| | $d_3$ = 6.7066 | $n_2$ = 1.6231 | $v_2$ = 49.55 |
| $r_4$ = 203.4951 | | | |
| | $d_4$ = 1.8 | | |
| $r_5$ = −226.5043 | | | |
| | $d_5$ = 15.97 | $n_3$ = 1.48915 | $v_3$ = 49.55 |
| $r_6$ = 16.2637 | | | |
| | $d_6$ = 3.4441 | | |
| $r_7$ = 190.2508 | | | |
| | $d_7$ = 14.7460 | $n_4$ = 1.69675 | $v_4$ = 50.81 |
| $r_8$ = 64.3775 | | | |
| | $d_8$ = 3.0 | | |

-continued

| | | | |
|---|---|---|---|
| $r_9 = \infty$ (stop) | | | |
| | $d_9$ = 15.5316 | | |
| $r_{10}$ = 263.4421 | | | |
| | $d_{10}$ = 10.2080 | $n_5$ = 1.80401 | $v_5$ = 42.24 |
| $r_{11}$ = 48.6675 | | | |
| | $d_{11}$ = 1.6126 | | |
| $r_{12}$ = 163.5026 | | | |
| | $d_{12}$ = 5.3722 | $n_6$ = 1.48915 | $v_6$ = 70.21 |
| $r_{13}$ = −38.5981 | | | |
| | $d_{13}$ = 0.15 | | |
| $r_{14}$ = 1.773 × 104 | | | |
| | $d_{14}$ = 7.4969 | $n_7$ = 1.51977 | $v_7$ = 52.42 |
| $r_{15}$ = −23.4478 | | | |
| | $d_{15}$ = 2.1285 | | |
| $r_{16}$ = −22.4235 | | | |
| | $d_{16}$ = 4.6763 | $n_8$ = 1.80642 | $v_8$ = 34.97 |
| $r_{17}$ = −43.2785 | | | |
| | $d_{17}$ = 0.15 | | |
| $r_{18}$ = 359.0173 | | | |
| | $d_{18}$ = 7.1648 | $n_9$ = 1.48915 | $v_9$ = 70.21 |
| $r_{19}$ = −32.15 | | | |
| | $d_{19}$ = 1.0 | | |
| $r_{20} = \infty$ | | | |
| | $d_{20}$ = 3.5 | $n_{10}$ = 1.46008 | $v_{10}$ = 66.75 |
| $r_{21} = \infty$ | | | |
| | $d_{21}$ = 0.01 | $n_{11}$ = 930 | $v_{11}$ = −3.45 |
| $r_{22}$ = −4.2 × 106 | | | |
| | $d_{22}$ = 0.1 | | |
| $r_{23} = \infty$ | | | |
| | $d_{23}$ = 2.0 | $n_{12}$ = 1.51825 | $v_{12}$ = 64.15 |
| $r_{24} = \infty$ | | | |
| | $d_{24}$ = 22.0 | $n_{13}$ = 1.51825 | $v_{13}$ = 64.15 |
| $r_{25} = \infty$ | | | |
| | $d_{25}$ = 10.0 | $n_{14}$ = 1.51825 | $v_{14}$ = 64.15 |
| $r_{26} = \infty$ | | | |
| | $d_{26}$ = 55.0 | $n_{15}$ = 1.58566 | $v_{15}$ = 46.39 |
| $r_{27} = \infty$ | | | |
| | $d_{27}$ = 7.3 | | |
| $R_{28} = \infty$ (image plane) | | | |
| fL/fDOE = 0.00996 | fR/fL = 0.88 | | |

| | lens-L5 | lens-L8 |
|---|---|---|
| fN/fL | −1.6856 | −1.4293 |

In the above data, $r_i$ is the radius of curvature of each surface; $d_i$ is the separation between each pair of adjacent surfaces; $n_i$ and $\sigma_i$ are the refractive index for the spectral d-line and Abbe's number of each optical element; and fR is the focal length of the rear lens unit 16. $r_{21}$ is the exit surface of the lens L10, and $r_{22}$ is the diffraction surface, which is formed on the exit surface of the lens L10. The diffraction surface equivalently has a high refractive index, i.e. 930, and a negative Abbe's number, i.e. −3.45.

Aberrations in this image-forming optical system are shown in FIG. 3(a)–3(f), in which: FIG. 3(a) illustrates spherical aberration; FIG. 3(b) illustrates astigmatism; FIG. 3(c) illustrates distortion; FIG. 3(d) illustrates lateral chromatic aberration; and FIG. 3(e) and FIG. 3(f) illustrate lateral aberrations at respective image heights which are 70% and 100% of the maximum image height.

Although in the above-described lens system the diffraction surface is provided on a plane surface, it may be provided on a curved surface having a power. In this case, it is desirable to set a power distribution such that the composite power, that is, the sum of the power of the diffraction surface and the power of the curved surface on which the diffraction surface is provided, is a positive value greater than the power of the curved surface.

Next, the flare removing circuit 7 will be described in detail.

Figure 4:
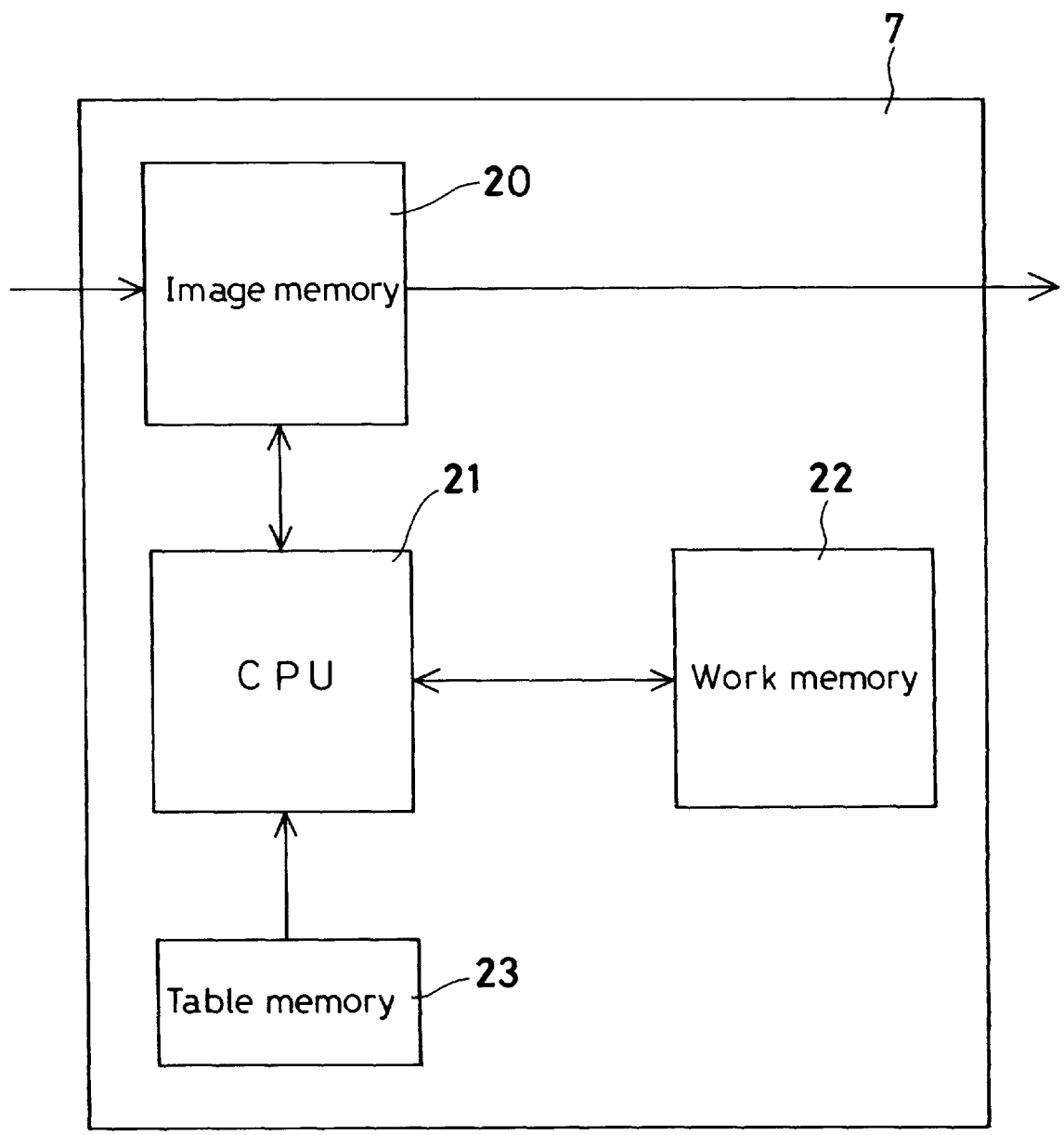
FIG. 4 shows the internal arrangement of a signal processing device in the first embodiment of the present invention.

FIG. 4 shows a specific arrangement of the flare removing circuit 7. The flare removing circuit 7 has an image memory 20 for temporarily storing the image signal from the signal processing circuit 6; an arithmetic processing unit (CPU) 21 that executes an arithmetic operation to remove a harmful signal component; a work memory 22 for temporarily storing data which is in the course of being processed; and a table memory 23 for storing data used to obtain a harmful signal component. Higher-order diffracted light has an extremely weak intensity. In this example, therefore, flare components attributed to zero- and second-order diffracted light are removed, and flare components attributed to the other higher orders of diffracted light are ignored.

The idea of removing flare components in this example is as follows: As has been stated above, an object image formed on an electronic image pickup device is a superposition of images formed by various orders of diffracted light. Therefore, it is necessary in order to remove flare components attributed to unwanted orders of diffracted light to obtain a light intensity distribution of each of the unwanted orders of diffracted light over the image plane. The light intensity distribution can be obtained from the point spread function (the energy intensity distribution about the image of a point source) of each order of light at each point and the intensity distribution of the object. However, the object intensity distribution itself is not known. In this example, therefore, flare components are approximately obtained by using the intensity distribution of the object image. That is, owing to various influences such as those of flare and aberrations, the intensity distribution of the object image is different from the light intensity distribution of the object which is to be imaged. However, the difference in intensity distribution is ignored because it is relatively small. Thus, point spread functions of a certain order of light are superimposed according to the intensity distribution of the object image to obtain a light intensity distribution of that order of light over the image plane. The light intensity distribution is regarded as a flare component attributed to that order of light, and it is subtracted from the object image. In general, the intensity of a flare component is weak in comparison to the intensity of the original object image. Therefore, there are few cases where an error arising from the above-described approximate operation gives rise to a problem. Accordingly, the flare component removing method according to the present invention is satisfactorily practicable.

The processing procedure will be described below more specifically. First, a point spread function is obtained for each order of diffraction from the design data about the image-forming optical system.

FIG. 5 conceptually shows the point spread functions of zero-, first- and second-order diffracted light produced by the above-described image-forming optical system. The figure shows each point spread function normalized such that the sectional area in the meridional or sagittal cross-section is 1. A result that is obtained by multiplying the point spread function of each order by the object image intensity at that point indicates the degree of contribution of the point image of this order with respect to the point in the object image.

Figure 6:
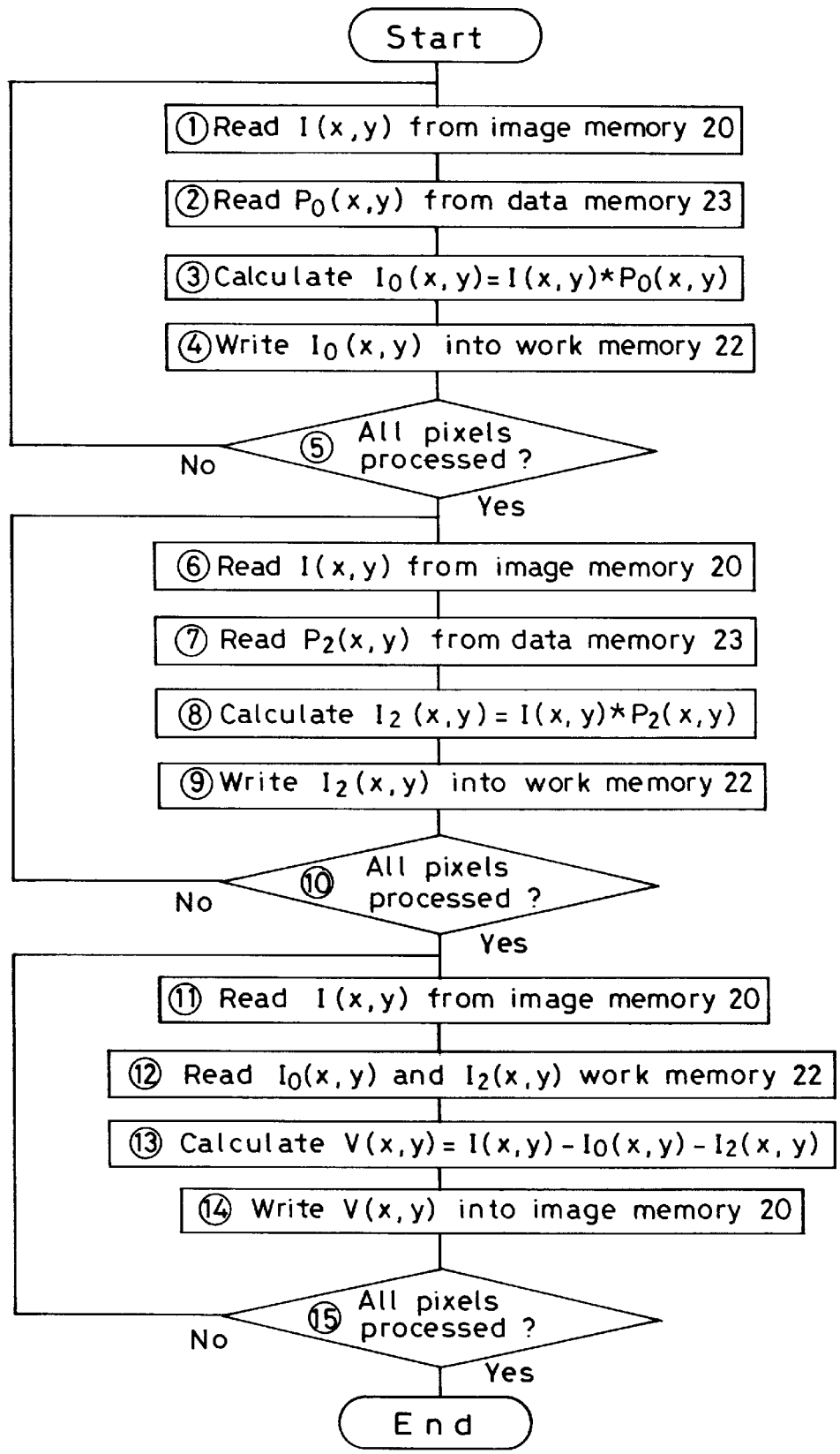
FIG. 6 is a flowchart showing a flare removing operation executed by a CPU in the first embodiment of the present invention.

The table memory 23 has the point spread functions of zero- and second-order diffracted light stored therein as digital data. Let us denote these point spread functions by $P_i(x,y)$, where subscript i represents the order of diffraction. In the expression $P_i(x,y)$, x and y are coordinates set in the image plane with the optical axis defined as the origin. The point spread function varies according to the object distance and the image height. However, it is assumed herein for simplicity that the point spread function of each order of diffraction is constant independently of the object distance and the image height. The image memory 20 is supplied with the image signal from the signal processing circuit 6 as digital data. Let us denote the image signal by I(x,y). The convolution of the image signal with the point spread function of each order of diffraction stored in the table memory 23 gives a signal indicating the energy intensity distribution of a flare component mixed in the object image owing to each order of diffracted light. Regarding the second order of diffraction, by way of example, $$I_2(x,y)=\int\int I(x-u,y-v)P_2(u,v)dudv \qquad (6)$$

gives a signal indicating the energy intensity distribution of a flare component mixed in the object image owing to second-order diffracted light. In the above expression, u and v are coordinates set in the object plane with the optical axis defined as the origin. The CPU 21 reads the image signal I (x,y) from the image memory 20 and also reads the point spread functions $P_0(x,y)$ and $P_2(x,y)$ of the unwanted orders of diffracted light from the table memory 23. Then, the CPU 21 executes the operation of the above-equation (6) successively for the zero- and second-order components to obtain $I_0(x,y)$ and $I_2(x,y)$, and stores the results $I_0(x,y)$ and $I_2(x,y)$ in the work memory 22. More specifically, first, the CPU 21 reads the image signal I (x,y) stored in the image memory 20 and the point spread function $P_0(x,y)$ of the zero-order of diffraction stored in the table memory 23, calculates the convolution integral of I (x,y) and $P_0(x,y)$, and writes the result of the calculation into the work memory 22. Next, the CPU 21 reads the image signal I (x,y) stored in the image memory 20 and the point spread function $P_2(x,y)$ of the second order of diffraction stored in the table memory 23, calculates the convolution integral of I (x,y) and $P_2(x,y)$, and stores the result of the calculation into the work memory 22. Next, the CPU 21 reads the image signal I (x,y) from the image memory 20 and the signals indicating the flare components from the work memory 22, performs subtraction on the read signals, and writes the result of the calculation into the image memory 20. As a result of this operation, a corrected image signal obtained by removing the unwanted-order components $I_0(x,y)$ and $I_2(x,y)$ from the original image signal I (x,y), i.e.

$$V(x,y)=I(x,y)-I_0(x,y)-I_2(x,y) \qquad (7)$$

is written into the image memory 20. The CPU 21 reads the corrected image signal V(x,y) and outputs it from the flare removing circuit 7. FIG. 6 is a flowchart showing the processing executed by the CPU 21.

By the above-described processing, an image signal having flare components removed therefrom is obtained. It should be noted that the image quality is further improved by combining the above-described processing with the conventional contour correcting technique.

Next, a second embodiment of the present invention will be described.

Figure 7:
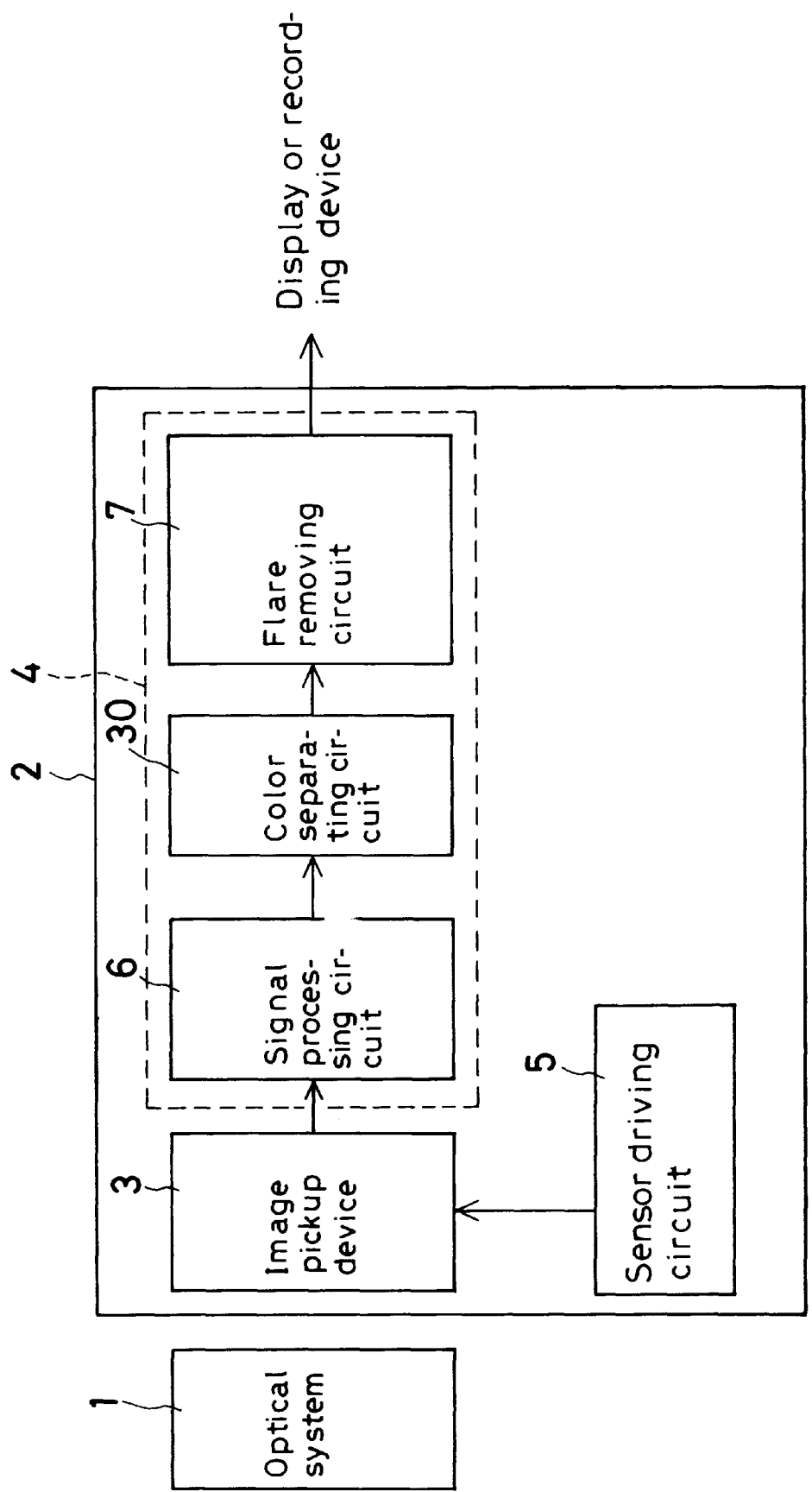
FIG. 7 is a block diagram showing the whole arrangement of a second embodiment of the present invention.

FIG. 7 is a block diagram showing the whole arrangement of the second embodiment. The second embodiment differs from the first embodiment shown in FIG. 1 in that the signal processing device 4 has a color separating circuit 30 between the signal processing circuit 6 and the flare removing circuit 7. Accordingly, the specific arrangement of the flare removing circuit 7 differs from that in the first embodiment as described later. However, the other portions of the second embodiment are essentially the same as those of the first embodiment; therefore, a detailed description thereof is omitted. This embodiment is arranged to remove a harmful signal component for each color component of the image signal. That is, image correction of higher accuracy is performed by taking into consideration the difference in diffraction efficiency of the diffraction surface for each wavelength.

Figure 8:
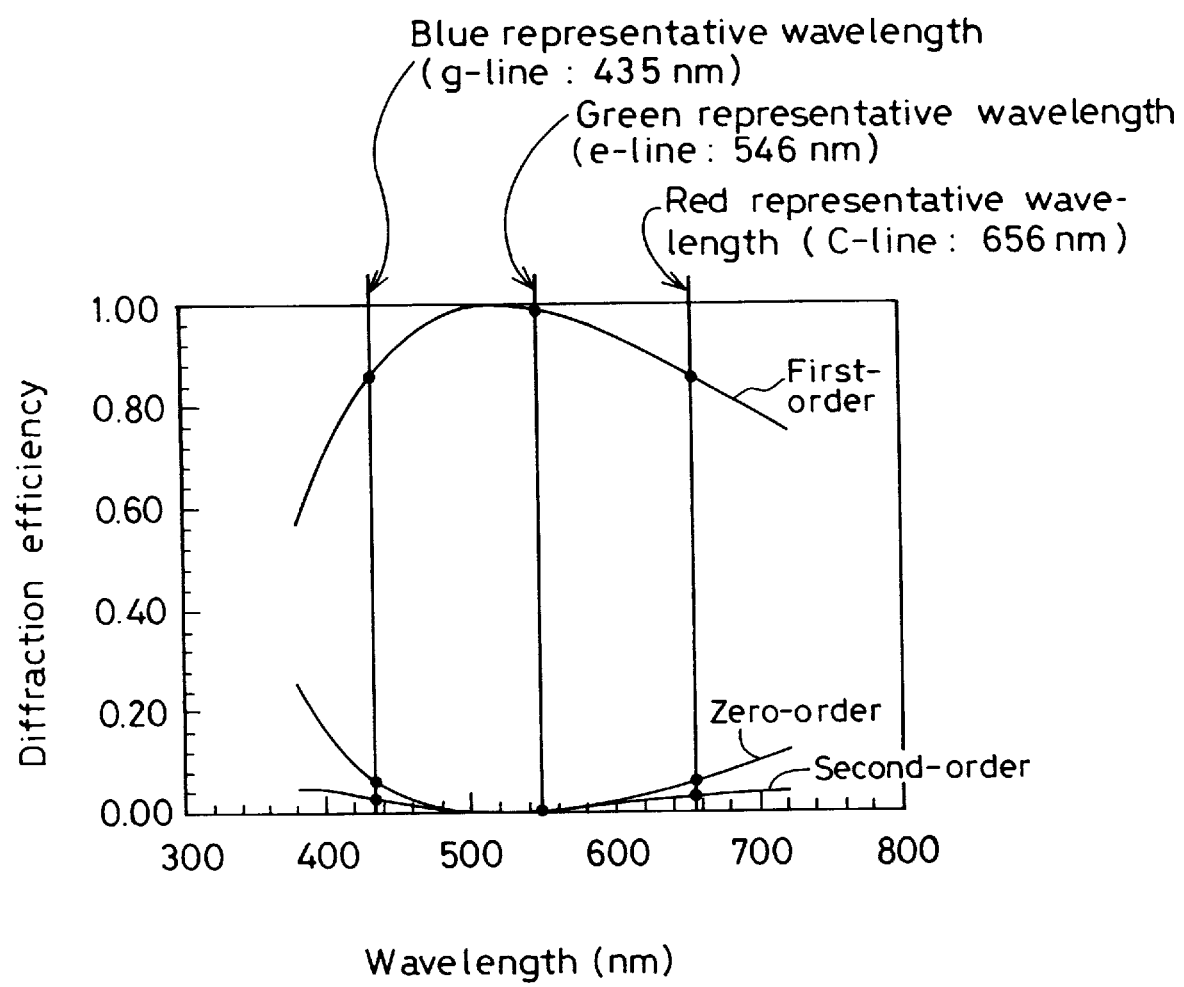
FIG. 8 is a graph showing the wavelength dependence of the diffraction efficiency of a diffraction surface.

FIG. 8 is a graph showing the diffraction efficiency of a diffraction surface included in the image-forming optical system. The diffraction efficiency of this diffraction surface for first-order diffracted light is 100% at the wavelength of 520 nanometers (i.e. optimized). Therefore, at this wavelength, there is no flare component. However, as the wavelength deviates from the optimization wavelength, the first-order diffraction efficiency reduces, and the flare components increase. In other words, because the proportion of the flare components may vary considerably for each wavelength, if the arrangement is such that a flare signal component obtained from one point spread function is subtracted from the image signal, there are cases where, although proper correction is performed for a certain wavelength component, over correction or under correction occurs for another wavelength component. Therefore, in this embodiment, C-line, e-line, and g-line are selected as wavelengths representative of the three primary colors, i.e. R, G, and B. as shown in FIG. 8. A point spread function of the image-forming optical system for each of the representative wavelengths is calculated, and each point spread function is multiplied by the diffraction efficiency of the diffraction surface. The resulting product is used as data for correction.

Figure 9:
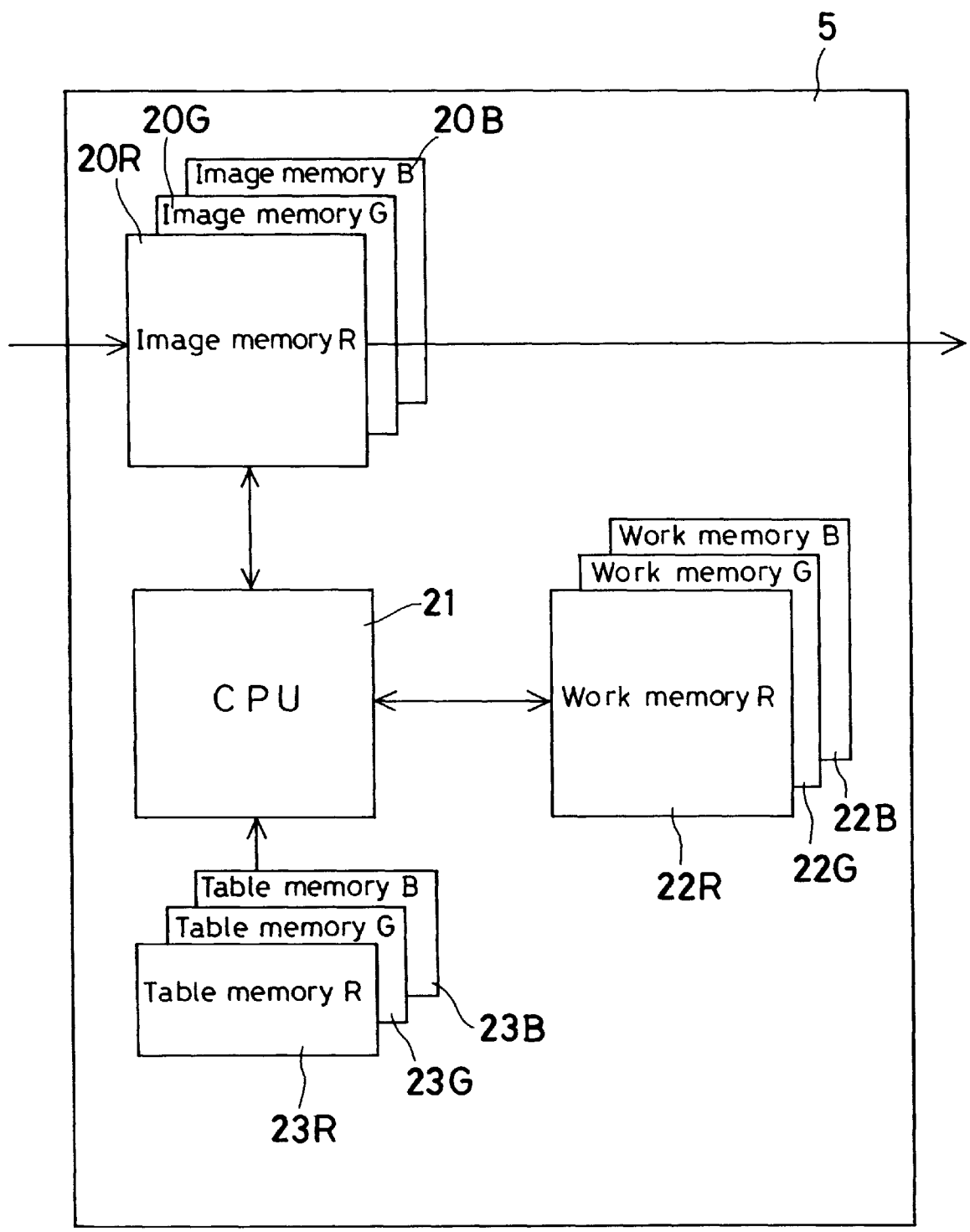
FIG. 9 shows the internal arrangement of a signal processing device in the second embodiment of the present invention.

FIG. 9 shows a specific arrangement of the flare removing circuit 7, in which image memories 20R, 20G and 20B are provided for the respective color signal components; work memories 22R, 22G and 22B are provided for the respective color components; and table memories 23R, 23G and 23B are provided for the respective color components to store point spread functions. In the table memories 23R, 23G and 23B, the above-described point spread functions $P_{0R}(x,y)$, $P_{2R}(x,y), \ldots, P_{2B}(x,y)$ are stored for each color component. In the functions $P_{0R}(x,y), P_{2R}(x,y), \ldots, P_{2B}(x,y)$, the first subscript represents an order, and the second subscript represents a color. Also stored in the table memories 23R, 23G and 23B are diffraction efficiency data $\eta_{0R}, \eta_{2R}, \ldots, \eta_{2B}$ for each wavelength and each order concerning the diffraction surface in the image-forming optical system.

The color separating circuit 30 supplies each color component of the image signal, and the supplied color components are stored in the image memories 20R, 20G and 20B, respectively. Correction processing similar to that in the first embodiment is executed for each color component. However, this embodiment differs from the first embodiment in that each point spread function multiplied by the diffraction efficiency, not the point spread function as it is, is used as correction data. Correction processing for the R component, for example, will be described below more specifically. The CPU 21 reads the R component signal $I_R(x,y)$ stored in the image memory 20R and the point spread functions $P_{0R}(x,y)$ and $P_{2R}(x,y)$ and diffraction efficiencies $\eta_{0R}$ and $\eta_{2R}$ stored in the table memory 23R. Regarding the zero order, for example, correction data is prepared by multiplying together the point spread function and the diffraction efficiency, i.e. $P_{0R}(x,y,\eta_{0R})=P_{0R}(x,y)\times\eta_{0R}$, and the convolution integral of the correction data $P_{0R}(x,y,\eta_{0R})$ and the R component signal $I_R(x,y)$ is calculated to obtain a correction signal indicating an unwanted-order light component, which is then written into the work memory 22R. The correction signal written in the work memory 22R is subtracted from the R component signal $I_R(x,y)$ to obtain a corrected R image signal, which is then stored in the image memory 20R. Similar processing is executed with regard to the G and B components as well. The corrected color signal components are read from the image memories 20R, 20G and 20B and outputted from the flare removing circuit 7. The processing for one color component is executed by the following additional steps: the step of reading the diffraction efficiency data for the zero order and the step of obtaining the product of the point spread function and diffraction efficiency for the zero order, which are inserted between the steps ② and ③ in the flowchart shown in FIG. 6; and the step of reading the diffraction efficiency data for the second order and the step of obtaining the product of the point spread function and diffraction efficiency for the second order, which are inserted between the steps ⑦ and ⑧ in the flowchart. Processing operations for the three color components may be sequentially carried out. However, it is preferable to execute parallel processing for the three color components because the time required to remove harmful signal components is shortened by the parallel processing. Although in this embodiment the point spread function data and the diffraction efficiency data are stored separately from each other and the two items of data are multiplied together during the operation, the product of the two items of data may be stored in a data memory. By doing so, the operation time can be shortened.

By the above-described processing, flare components can be removed with higher accuracy, and the image quality is still further improved.

Although in this embodiment the color separating circuit 30 is provided to separate color components of the image signal, it should be noted that the signal processing according to this embodiment is also applicable, without any problem, to an imaging apparatus of the type in which color components are optically separated by a color separating optical system, and each color component is supplied to an image processing device after being individually subjected to predetermined processing, as in a three-chip television camera, for example.

Next, modifications of the above-described embodiments will be described.

First, the removal of flare components according to the image height will be described.

Figure 10:
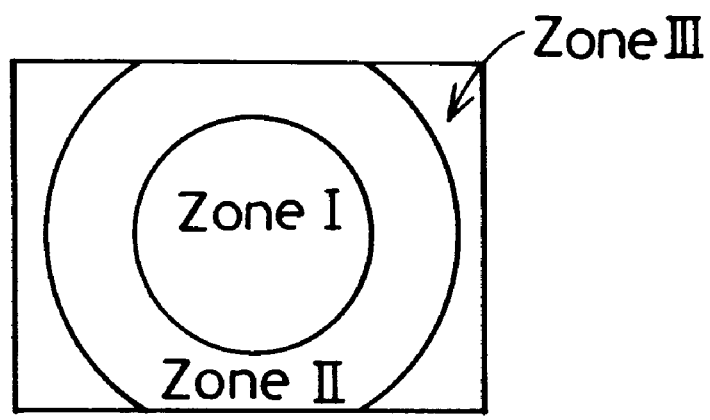
FIG. 10 shows the way in which an image plane is divided into a plurality of zones.

In the foregoing embodiments, the variation in point spread function according to the image height is ignored with a view to minimizing the number of items of point spread function data to be stored in the table memory. However, it is desirable to use different point spread functions for different image heights in order to perform correction even more finely. In this case, it is desirable in order to attain the highest accuracy of correction to calculate a point spread function for each pixel and store the calculated function in the table memory. In such a case, however, a massive amount of data is needed. Therefore, the arrangement may be such that image heights are divided into some zones, and different point spread functions are used for different zones, respectively. An example of this scheme is shown in FIG. 10. The rectangle in the figure is the light-receiving surface of an image pickup device. The rectangle is divided by concentrical boundaries centered on the optical axis of the image-forming optical system into three zones, i.e. zone I of image height ratio 0 to 0.4; zone II of image height ratio 0.4 to 0.7; and zone III of image height ratio 0.7 to 1. In zone I, a point spread function at the image height ratio 0.4 is used; in zone II, a point spread function at the image height ratio 0.6 is used; and in zone III, a point spread function at the image height ratio 0.8 is used. The term "image height ratio" as used herein means an image height normalized by the highest image height.

Figure 12:
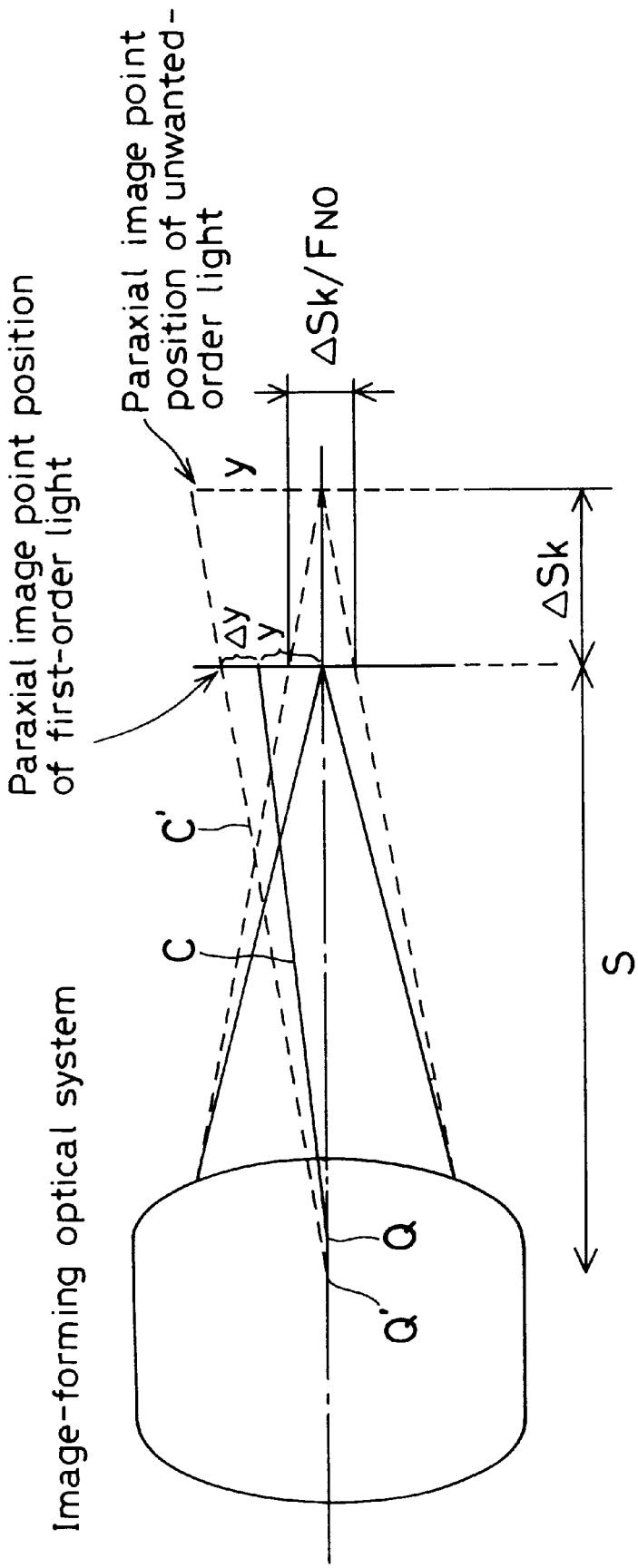
FIG. 12 schematically shows light emanating from an image-forming optical system to reach an image plane.

It should be noted that it is desirable in the case of performing correction according to the image height to take into consideration the variation in magnification according to the order of diffraction. More specifically, the magnification of an optical system including a diffraction surface differs for each order of diffraction. Therefore, when first-order diffracted light is used as light that contributes to the proper image formation, light of unwanted orders of diffraction, i.e. zero order and second order, are incident at different positions from the incident position of first-order light on the image plane. Consequently, the light intensity at an off-axis image point is, in the strict sense, a superposition of the intensities of different orders of diffracted light from different object points. For example, one image point is a superposition of first-order diffracted light from an object point corresponding to the image point, zero-order diffracted light from an object point which is smaller in distance from the optical axis than the first-mentioned object point, and second-order diffracted light from an object point which is larger in distance from the optical axis than the first-mentioned object point. To correct the displacement, it is desirable to multiply a flare component by a coefficient for each order of diffraction and subtract the resulting product from the image signal. As the coefficient, it is preferable to use the ratio $\Delta\beta$ of the principal ray height of first-order light to that of unwanted-order light in the paraxial image-formation plane of first-order light used for image formation (i.e. working order of light). FIG. 12 schematically shows light emanating from an image-forming optical system to reach an image plane. The continuous lines show first-order light, and the dashed lines show unwanted-order light. Reference characters C and C' respectively denote principal rays of first-order light and unwanted-order light, which emanate from the same object point. Reference characters Q and Q' denote exit pupil positions for the principal rays C and C', respectively. It should be noted that C' representatively shows light of a specific order of diffraction among unwanted orders of diffracted light. In reality, there are a large number of principal rays of unwanted orders of diffracted light. $\Delta y$ is the height difference between the principal rays of first-order light and unwanted-order light in the paraxial image plane of first-order light.

The height ratio $\Delta\beta$ of C to C' in the image plane of first-order light can be approximately obtained by $$\Delta\beta = y/y' = S/(S+\Delta Sk)$$

where y is the principal ray height in the image plane of first-order light; y' is the principal ray height of unwanted-order light in the image-formation plane of this order; and S is the distance between the image plane and the pupil Q of the image-forming optical system.

The value of $\Delta\beta$ differs for each order of diffraction of unwanted light. Therefore, $\Delta\beta$ is obtained for each order of diffraction. When a flare component of each order of diffraction is to be obtained, position coordinates are multiplied by $\Delta\beta$, and the convolution integral of the object image energy intensity distribution I (x,y) and the point spread function is calculated.

To perform the above-described correction, it is desirable to have as correction data the pupil position of the image-forming optical system for each order of diffraction relative to the paraxial image plane of first-order light, the position of the best image plane or Gaussian image plane of unwanted-order light, and the magnification ratio of an image formed by unwanted-order light to an image formed by first-order light. With these items of data, it is possible to obtain a height at which the principal ray of unwanted-order light cuts the best image plane of first-order light. Therefore, a point spread function used to remove a flare component for each order of diffraction should be corrected on the basis of the difference between the image height of first-order light and the position at which the principal ray of unwanted-order light cuts the best image plane of first-order light.

It should be noted that the value of $\Delta\beta$ varies with changes in the image-forming optical system, such as movement of lenses and a change in the lens separation during focusing or zooming of the image-forming optical system. Therefore, it is even more desirable to arrange the apparatus such that flare components can be removed with the change in value of $\Delta\beta$ being incorporated in the correction processing. For this purpose, it is desirable to store the above-described data in the table memory in the form of dot series data corresponding to each state of the image-forming optical system, e.g. each object distance and each focal length, and to have a device for calculating $\Delta\beta$ by using appropriate data for each state of the image-forming optical system. Alternatively, the arrangement may be such that $\Delta\beta$ per se is stored in the table memory as dot series data in advance, and appropriate data is read out according to a change in the state of the image-forming optical system. It is easy for recent cameras to judge a state in which the image-forming optical system is placed at present. That is, recent cameras are equipped with an automatic focus detection device in which information indicating an object distance is used to bring the image-forming optical system into a focused state. Therefore, it is possible to judge the present state of the image-forming optical system by using the object distance information and to read out suitable data from the table memory. Even when automatic focus detection is not carried out, because lens movement for focusing can be readily read in the form of an electric signal by using, for example, an encoder provided on the lens barrel, the present state of the image-forming optical system can be detected on the basis of such information. Regarding zooming also, the present state of the image-forming optical system can be similarly recognized.

It should be noted that, regarding unwanted-order light that is smaller in magnification than the proper image formation, the above-described method cannot sufficiently remove flare from the peripheral portion of the image owing to lack of information concerning the point spread function I (x,y). However, it cannot be helped.

Next, the removal of flare components according to the F-number of the image-forming optical system will be described.

Although in the foregoing embodiments the change of the point spread function with the change of the F-number is ignored, it is desirable with a view to performing correction with higher accuracy to store in the table memory a large number of point spread functions corresponding to variations in the aperture diameter of the stop provided in the image-forming optical system and to read data different according to the change in the aperture diameter of the stop to perform an operation for correction. In this case, however, a massive amount of data is needed. Therefore, it is preferable to perform an operation in which changes of the F-number are roughly taken in as stated below.

The focal length and focus position of a diffraction optical element vary for each order of diffraction. Therefore, in an optical system including a diffraction surface, there is a paraxial image plane for each order of diffraction. Accordingly, in a state where first-order light, which is the working order of light, is focused on the proper image-formation plane, unwanted orders of diffracted light are out of focus in the image plane, and the point image energy intensity distributions of the unwanted orders of diffracted light spread to a considerable extent to overlap first-order light. Images formed by unwanted orders of diffracted light also contain aberration, and the aberration is considerably larger than that in first-order light. However, the difference in the paraxial image plane position is a more important factor in inducing image blur. Therefore, a function indicating the energy intensity distribution about the image of a point source may be determined by taking into consideration only image blur due to the difference in the paraxial image plane position, in disregard of aberration and vignetting, for approximation or practical purposes.

The sectional area of the spread of the point image is approximately proportional to the aperture diameter of the stop; therefore, by making use of this fact, a point image energy intensity distribution when the stop is in a stopped down state can be calculated from the point image energy intensity distribution in a full-aperture state and used for the operation for correction.

Figure 11:
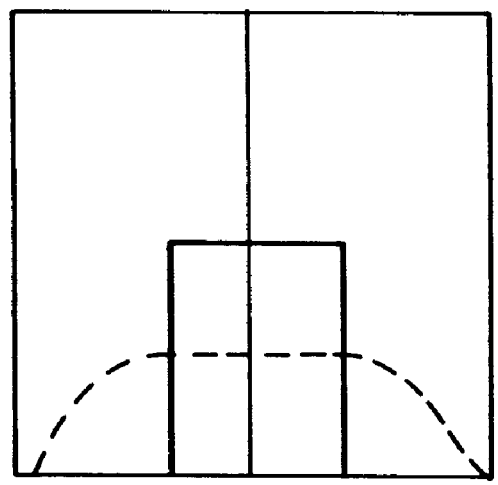
FIG. 11 shows a point image energy intensity distribution corrected according to F-stop number.

Referring to FIG. 11, the dashed line shows a point image energy intensity distribution when the stop in the image-forming optical system is in a full-aperture state. Assuming that the full-aperture F-number is $F_0$ and the F-number in a stopped-down state is $F_1$, a portion equivalent to $(1-F_0/F_1) \times 100/2$ in terms of percentage by sectional area is eliminated from each side of the point image energy intensity distribution in the full-aperture state, and thereafter, the remaining energy intensity distribution is multiplied by $F_1/F_0$ so that the sectional area is 1. Thus, the energy intensity distribution shown by the continuous line in FIG. 11 is obtained. This is used as the point image energy intensity distribution in a state where the aperture of the stop is reduced so that the F-number becomes equal to $F_1$.

More specifically, correction data $P_i(x,y)$ in the full-aperture state is stored in the data memory in advance, and before the CPU calculates the convolution integral of the object image energy intensity distribution and the correction data to calculate an unwanted-order light component, an operation is executed in which $P_i(x,y) \times (1-F_0/F_1) \times (100/2)$ is determined and this is eliminated from each end of $P_i(x,y)$, and then the remainder is multiplied by $F_1/F_0$. The function $P'_i(x,y)$ thus obtained is used in place of the correction data $P_i(x,y)$ to calculate the convolution integral.

Alternatively, the following function may be used in place of the point spread function.

Referring to FIG. 12, the positional displacement in the optical axis direction of the paraxial image point of a specific unwanted order of diffracted light relative to the paraxial image point of first-order light is denoted by $\Delta Sk$, and the F-number of the image-forming optical system is denoted by $F_{NO}$. In the image plane, the intensity of unwanted-order light due to blur has a finite value within the range of radius $\Delta Sk/2F_{NO}$, but it assumes a sufficiently small value outside that range.

Figure 13:
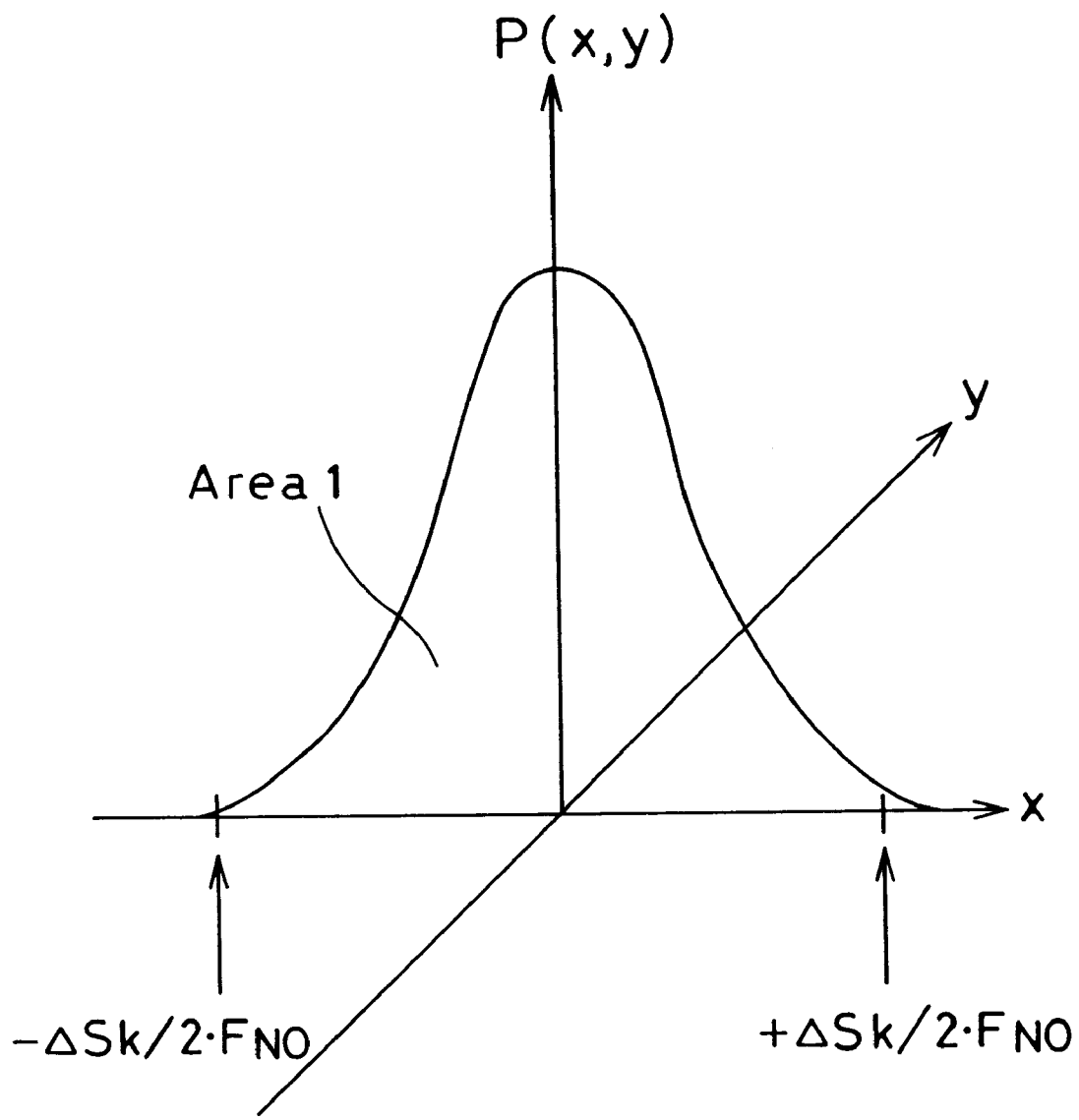
FIG. 13 shows an approximate point spread function.

Therefore, as shown for example in FIG. 13, an arbitrary function having the above nature is normalized such that the sectional area in the meridional or sagittal cross-section is 1, and it is employed as a function expressing the point image energy intensity distribution of the specific unwanted order of diffracted light. There is no particular restriction on the form of the function. However, as a criterion to be met for the function to assume a sufficiently small value outside the range of radius $\Delta Sk/2F_{NO}$, it is preferable that the integral of the function within the range of radius $\Delta Sk/2F_{NP}$ should be not less than 80% of the integral of the function over the entire range of integration. If the integral within the above-mentioned range is less than the limit value, i.e. 80%, the spread of the function becomes excessively large, and the level of flare removal lowers. It is desirable for the limit value to be as large as possible; 90% or more is even more desirable. It is preferable to use Gaussian distribution function $A \exp[-a(x^2+y^2)]$ (A and a are constants) or the like because it provides a relatively high degree of approximation to the actual point image energy intensity distribution, and moreover, enables the calculation of convolution and so forth to be performed with relative ease. In this case, the values of the constants A and a are varied according to a change in the F-number of the image-forming optical system or a change in the displacement $\Delta Sk$ of the paraxial image points (i.e. a change of the range of $\Delta Sk/2F_{NO}$) so that the value of the function is kept sufficiently small outside the range of $\Delta Sk/2F_{NO}$.

Incidentally, even when the aperture diameter of the stop in the image-forming optical system is not changed, the value of $\Delta Sk$ changes in response to focusing or zooming performed in the image-forming optical system as in the case of $\Delta \beta$. The value of $F_{NO}$ also changes in response to zooming, etc. To adjust the degree of image quality correction in accordance with such changes, the following methods are conceivable.

According to one method, the value of $\Delta Sk$ corresponding to each state of the image-forming optical system is stored in the table memory in the form of dot series data in advance, and the point spread function is corrected by using the stored data before the convolution integral is calculated. That is, the value of $\Delta Sk$ that conforms to a particular object distance is read out of the table memory on the basis of a signal from an automatic focus detection device or a signal indicating the lens position moved for focusing, and the form of the point spread function is corrected by using the value of $\Delta Sk$. The same is the case with zooming. That is, on the basis of a signal indicating the lens position moved for zooming, the value of $\Delta Sk$ that corresponds to the focal length position is read out to correct the form of the function. In the case of Gaussian distribution function, the values of the constants A and a are changed according to the size of $\Delta Sk$.

It should be noted that, although the object distance and the focal length change continuously, the correction signal may change discontinuously. That is, the arrangement may be such that the object distance range or the focal length range within which zooming can be performed is divided into some zones, and as long as an object remains in one zone, the same value of $\Delta Sk$ is used. By doing so, the number of items of dot series data concerning $\Delta Sk$ can be reduced.

Alternatively, it is also possible to store in the table memory basic data necessary for calculating $\Delta Sk$, such as lens data concerning the image-forming optical system and data about the stop position, and to have a device for reading a focusing or zooming condition from a focus detection signal or a signal indicating the lens position and for calculating $\Delta Sk$ on each occasion according to the object distance or the zooming condition.

Next, the removal of flare components for each color component will be described.

According to the second embodiment, the flare removal is carried out for each of the three color components, i.e. R, G and B. However, as will be understood from FIG. 8, the amount of unwanted-order diffracted light is extremely small at the wavelength of G because the wavelength of G is very close to the wavelength at which the diffraction efficiency of the diffraction surface is 100%. Accordingly, the arrangement may be such that, for the G color component, signal processing for flare removal is omitted, and correction is performed only for the R and B color components. For further simplification, the wavelength at which the diffraction efficiency of the diffraction surface is 100% is set in the vicinity of the middle between two color components, and signal processing for flare removal is executed only for the remaining one wavelength component. For example, if the diffraction surface is optimized such that the diffraction efficiency is 100% at a wavelength in the vicinity of the middle between the B and G components (e.g. 580 nanometers), the diffraction efficiency shows a considerably high value at the wavelengths of the B and G components (accordingly, flare components reduce), whereas at the wavelength of the R component the diffraction efficiency reduces, and therefore, the amount of unwanted-order diffracted light increases, causing the amount of flare components to increase. Accordingly, a considerable effect can be produced even if correction for the B and G components is omitted, and correction is performed only for the R component. In the first embodiment, the flare removing processing is executed only once for the RGB component signals supplied from the signal processing circuit 6 to the flare removing circuit 7. In this regard, if the above-described arrangement is adopted, flare removal can be effected by the procedure according to the first embodiment without any problems. The arrangement may also be such that a wavelength at which the diffraction efficiency is 100% is set in the vicinity of the middle between the G and R components, and correction is performed only for the B component.

It is also possible to use correction data prepared by multiplying the point image energy intensity distribution of each color by the mixture ratio of R, G, and B based on the color temperature of white color and then mixing together the resulting products for the three colors. More specifically, the point image energy intensity distribution at the representative wavelength of each of R, G and B is multiplied by the diffraction efficiency at each wavelength and further multiplied by the color component size ratio based on the color temperature. Then, the resulting products for the RGB color components are added together to calculate a function expressing the point image energy intensity distribution. The point image energy intensity distribution thus obtained differs from the point image energy intensity distribution of any color component; conversely, the difference between the above point image energy intensity distribution and that of any color component is small. Therefore, when a single point image energy intensity distribution is used to remove flare components of all colors, errors are smaller than in a case where the point image energy intensity distribution of one color component is used to perform correction for all colors. Accordingly, it is preferable to use the above-described point image energy intensity distribution in a case where importance is attached to simplification of the arithmetic processing.

Finally, a method of calculating flare components will be described.

In the foregoing embodiment, the convolution integral of the correction data [$P_i(x,y)$ or $P_i(x,y,\eta)$] and the object image energy intensity distribution I (x,y) is calculated to obtain a signal indicating a flare component. However, it is also possible to obtain a signal indicating a flare component by performing a Fourier transform on each of the correction data and the object image energy intensity distribution and performing an inverse Fourier transform on the product of the results of the Fourier transform operation. In this case, a Fourier transform may be performed on correction data each time an operation for correction is performed. To shorten the operation time, it is preferable to take the following procedure: Data obtained by performing a Fourier transform on $P_i(x,y)$ or $P_i(x,y,\eta)$ is stored in the data memory in advance. After reading the image signal from the image memory and the correction data from the data memory, the CPU performs a Fourier transform on the image signal, multiplies together the result of the Fourier transform operation and the read correction data, performs an inverse Fourier transform on the resulting product to obtain a flare component, and writes it into the work memory.

According to the present invention, if the convolution integral operation is performed for each pixel, the computational quantity becomes extremely large. To reduce the computational quantity, it is preferable to employ the following method: The pixels on the imaging surface of the image pickup device are divided into $10^3$ to $10^4$ blocks each consisting of some pixels. In each block, a flare component is obtained for one pixel (i.e. one pixel in each block is sampled). For the pixels in the same block, the same flare component is removed. Regarding the way of selecting a representative pixel, a pixel to be selected may be predetermined. Alternatively, the pixel having the highest brightness signal in each block may be selected.

The present invention is most effective when the minimum value p of the pixel pitch of the electronic image pickup device is within the range of $$1.0\times10^{-6} < p/fL < 1.0\times10^{-3}.$$

It should be noted that the image-forming optical system may include not only a refracting optical element and a diffraction optical element but also a reflecting optical element. Further, to obtain a flare component, it is possible to use not a point image energy intensity distribution but the energy intensity distribution about a spread image (i.e. line spread function) of a linear object extending in the x-direction, y-direction, radial direction or tangential direction, which is formed by the image-forming optical system. It is also preferable to combine the diffraction surface with an electrical device for removing a uniform flare component extending over the entire image field owing to unwanted orders of diffracted light produced by the diffraction surface. It is preferable from the viewpoint of flare prevention to use such a diffraction surface that, among orders of diffracted light produced thereby, only a specific order of diffracted light that contributes to the proper image formation has a wavelength at which the diffraction efficiency is 50% or more in the visible wavelength range of from 400 nanometers to 700 nanometers. It is desirable for the diffraction surface to have diffracted light-producing grooves formed in the shape of closed loops.

What we claim is:

1. An electronic imaging apparatus comprising:
   an image-forming optical system for forming an image of an object;
   an electronic image pickup device for converting the image formed by said image-forming optical system into an electric signal representing said image; and
   signal processing means for converting the signal obtained by said electronic image pickup device into an image signal that can be displayed on output means, for example, a display unit;
   wherein said image-forming optical system includes a diffraction surface, said signal processing means includes image processing means for improving image quality, and said electronic imaging apparatus satisfies the following condition:

$$1.0\times10^{-6} < p/fL < 1.0\times10^{-3}$$

where p is a minimum value of a distance between centers of adjacent pixels of said electronic image pickup device, and fL is a focal length of said image-forming optical system.

2. An electronic imaging apparatus comprising:

an image-forming optical system for forming an image of an object;

an electronic image pickup device for converting the image formed by said image-forming optical system into an electric signal representing said image; and signal processing means for converting the signal obtained by said electronic image pickup device into an image signal that can be displayed on output means, for example, a display unit;

wherein said image-forming optical system includes a diffraction surface, said signal processing means includes image processing means for improving image quality, and said electronic imaging apparatus satisfies the following condition:

$$0.1 < -fN/fL < 2$$

where fN is a focal length of said optical element having a negative focal length, and fL is a focal length of said image-forming lens system.

3. An electronic imaging apparatus comprising:

an image-forming optical system for forming an image of an object;

an electronic image pickup device for converting the image formed by said image-forming optical system into an electric signal representing said image; and signal processing means for converting the signal obtained by said electronic image pickup device into an image signal that can be displayed on output means, for example, a display unit;

wherein said image-forming optical system includes a diffraction surface, and said signal processing means includes image processing means for improving image quality, and wherein said image processing means includes means for calculating flare components due to unwanted orders of diffracted light produced by said diffraction surface by using a point image energy intensity distribution P(x,y) about an image of a point source, which is formed by said image-forming optical system, and for removing the flare components.

4. An electronic imaging apparatus comprising:

an image-forming optical system for forming an image of an object;

an electronic image pickup device for converting the image formed by said image-forming optical system into an electric signal representing said image; and signal processing means for converting the signal obtained by said electronic image pickup device into an image signal that can be displayed on output means, for example, a display unit;

wherein said image-forming optical system includes a diffraction surface, and said signal processing means includes image processing means for improving image quality, wherein said image processing means includes storage means for storing a point image energy intensity distribution P(x,y) about an image of a point source of an unwanted order of diffracted light, which is formed by said image-forming optical system;

means for obtaining a flare component by calculating a convolution of an object image signal I(x,y) indicating an object image, which is obtained from said electronic image pickup device, with the point image energy intensity distribution P(x,y) stored in said storage means; and means for subtracting said flare component from said object image signal.

5. An electronic imaging apparatus comprising:

an image-forming optical system for forming an image of an object;

an electronic image pickup device for converting the image formed by said image-forming optical system into an electric signal representing said image; and signal processing means for converting the signal obtained by said electronic image pickup device into an image signal that can be displayed on output means, for example, a display unit;

wherein said image-forming optical system includes a diffraction surface, and said signal processing means includes image processing means for improving image quality, wherein said image processing means includes storage means for storing a point image energy intensity distribution P(x,y) about an image of a point source of an unwanted order of diffracted light, which is formed by said image-forming optical system;

means for obtaining a Fourier transform of said point image energy intensity distribution P(x,y);

means for obtaining a Fourier transform of an object image signal I(x,y) indicating an object image, which is obtained from said electronic image pickup device;

means for obtaining a flare component by obtaining a product of the Fourier transform of said point image energy intensity distribution and the Fourier transform of said object image signal and obtaining an inverse Fourier transform of said product; and means for subtracting said flare component from said object image signal.

6. An electronic imaging apparatus according to claim 1, wherein said image processing means is a circuit means for removing flare components due to unwanted orders of diffracted light produced by said diffraction surface that has negative equivalent dispersion and corrects chromatic aberration.

7. An electronic imaging apparatus according to claim 6, wherein said diffraction surface has grooves formed in a shape of closed loops to produce diffracted light.

8. An electronic imaging apparatus according to claim 2, wherein said image-forming optical system has a stop; a front lens unit disposed in front of said stop; and a rear lens unit disposed behind said stop; and wherein either one of said front lens unit and rear lens unit which has a shorter positive focal length than the other includes an optical element having a negative focal lenrth, and a diffraction surface.

9. An electronic imaging apparatus according to claim 2, wherein said image-forming optical system has a stop; a front lens unit disposed in front of said stop; and a rear lens unit disposed behind said stop, said rear lens unit having a positive power, said rear lens unit including an optical element having a negative focal length, and at least one diffraction surface.

10. An electronic imaging apparatus according to claim 2, 8 or 9, which satisfies the following condition:

$$fL/fDOE < 0.07 \tag{5}$$

where fDOE is a focal length attributed only to diffracting action of said diffraction surface, and fL is a focal length of said image-forming optical system.

11. An electronic imaging apparatus according to claim 3, 4, or 5, further comprising means for supplying said object image signal to said image processing means in a form of three color component signals, wherein said image processing means executes processing for removing flare components containing light components of unwanted orders of diffraction produced by said diffraction surface with respect to a plurality of color component signals.

12. An electronic imaging apparatus according to claim 11, wherein said image-forming optical system includes a diffraction surface whose diffraction efficiency reaches a maximum within a wavelength range of from 500 nanometers to 550 nanometers, and wherein said image processing means executes processing for removing flare components containing light components of unwanted orders of diffraction with respect to a blue signal component and red signal component.

13. An electronic imaging apparatus according to claim 11, wherein said image-forming optical system includes a diffraction surface whose diffraction efficiency reaches a maximum within a visible wavelength range of not more than 500 nanometers, and wherein said image processing means executes processing for removing flare components containing light components of unwanted orders of diffraction with respect to a red signal component.

14. An electronic imaging apparatus according to claim 11, wherein said image-forming optical system includes a diffraction surface whose diffraction efficiency reaches a maximum within a visible wavelength range of not less than 550 nanometers, and wherein said image processing means executes processing for removing flare components containing light components of unwanted orders of diffraction with respect to a blue signal component.

15. An electronic imaging apparatus according to claim 3, further comprising storage means for storing said point image energy intensity distribution.

16. An electronic imaging apparatus according to claim 15, wherein said storage means has an energy intensity distribution about an image of a point source stored therein as data indicating said point image energy intensity distribution for each of a plurality of color components of said object image signal and for each unwanted order of diffraction.

17. An electronic imaging apparatus according to claim 15, wherein said storage means has an energy intensity distribution about an image of a point source stored therein as data indicating said point image energy intensity distribution for each object distance or for each image height ratio or for each F-number of said image-forming optical system.

18. An electronic imaging apparatus according to claim 15, wherein said image processing means has means for calculating from said point image energy intensity distribution stored in said storage means a point image energy intensity distribution different in photographing conditions from said point image energy intensity distribution stored in said storage means.

19. An electronic imaging apparatus according to claim 16, wherein said storage means has normalized data stored therein as data indicating said point image energy intensity distribution, said normalized data being prepared by normalizing point image energy intensity distributions of at least zero- and second-order diffracted light with respect to a representative wavelength of each of blue, green and red color components of said object image signal such that a sectional area in a meridional or sagittal cross-section is 1.

20. An electronic imaging apparatus according to claim 19, wherein said storage means has data stored therein, said data indicating diffraction efficiencies of at least zero- and second-order diffracted light at said diffraction surface with respect to the representative wavelength of each of the blue, green and red color components of said object image signal.

21. An electronic imaging apparatus according to claim 16, wherein said storage means has data stored therein as data indicating said point image energy intensity distribution, said data being prepared by normalizing point image energy intensity distributions of at least zero- and second-order diffracted light with respect to a representative wavelength of each of blue, green and red color components of said object image signal such that a sectional area in a meridional or sagittal cross-section is 1, thereby obtaining normalized data, and multiplying said normalized data by a diffraction efficiency of said diffraction surface at each of said wavelengths.

22. An electronic imaging apparatus according to claim 16, wherein said storage means has data stored therein as data indicating said point image energy intensity distribution, said data being prepared by normalizing point image energy intensity distributions of at least zero- and second-order diffracted light with respect to a representative wavelength of each of blue, green and red color components of said object image signal such that a sectional area in a meridional or sagittal cross-section is 1, thereby obtaining normalized data, and multiplying said normalized data by a diffraction efficiency of said diffraction surface at each of said wavelengths and further multiplying a resulting product by a mixture ratio of blue, green and red based on a color temperature of white color, and then mixing together resulting products for the three colors.

23. An electronic imaging apparatus according to claim 4 or 5, wherein, assuming that a full-aperture F-number of said image-forming optical system is $F_0$, and an F-number of said image-forming optical system in a stopped-down state is $F_1$, a point image energy intensity distribution in a state of $F_0$ has been stored in said storage means, and wherein said image processing means eliminates a portion equivalent to $(1-F_0/F_1) \times 100/2$ in terms of percentage by sectional area in a meridional or sagittal cross-section from each side of said point image energy intensity distribution, and thereafter, said image processing means multiplies the remaining point image energy intensity distribution by $F_1/F_0$ so that the sectional area is 1, thereby obtaining a function, and executes an operation for removing flare components by using said function as a point image energy intensity distribution in a state of F-number $F_1$.

24. An electronic imaging apparatus according to claim 3, wherein said image processing means includes storage means for storing a point image energy intensity distribution $P(x,y)$ about an image of a point source of an unwanted order of diffracted light, which is formed by said image-forming optical system, and wherein, assuming that a full-aperture F-number of said image-forming optical system is $F_0$, and an F-number of said image-forming optical system in a stopped-down state is $F_1$, a point image energy intensity distribution in a state of $F_0$ has been stored in said storage means, and wherein said image processing means eliminates a portion equivalent to $(1-F_0/F_1)\times 100/2$ in terms of percentage by sectional area in a meridional or sagittal cross-section from each side of said point image energy intensity distribution, and thereafter, said image processing means multiplies the remaining point image energy intensity distribution by $F_1/F_0$ so that the sectional area is 1, thereby obtaining a function, and executes an operation for removing flare components by using said function as a point image energy intensity distribution in a state of F-number $F_1$.

25. An electronic imaging apparatus according to any of claims 17, 18, 19, 20, 21, 22 or 24, wherein said object image is divided into a plurality of annular zones according to image height, and wherein said storage means contains for each of said zones a point image energy intensity distribution at a representative image height selected from that zone.

26. An electronic imaging apparatus according to claim 17, wherein said storage means has information stored therein to calculate a ratio of a principal ray height of a working order of diffracted light to a principal ray height of a diffracted light order adjacent to said working order in a paraxial image plane formed by said working order of diffracted light.

27. An electronic imaging apparatus according to claim 3, wherein an arbitrary function is used as a point image energy intensity distribution about an image of a point source of an unwanted order of diffracted light, which is formed by said image-forming optical system, said arbitrary function having a finite value within a range of radius $\Delta Sk/2F_{NO}$ and assuming a sufficiently small value outside said range, where $\Delta Sk$ is a difference in a direction of an optical axis of said image-forming optical system between a paraxial image point position of an unwanted order of diffracted light and a paraxial image point position of a working order of diffracted light, and $F_{NO}$ is an F-number of said image-forming optical system.

28. An electronic imaging apparatus according to claim 27, wherein said arbitrary function is such that an integral of said function within the range of radius $\Delta Sk/2F_{NP}$ is not less than 80% of an integral of said function over an entire range of integration.

29. An electronic imaging apparatus according to claim 27, wherein said arbitrary function is such that an integral of said function within the range of radius $\Delta Sk/2F_{NP}$ is not less than 90% of an integral of said function over an entire range of integration.

30. An electronic imaging apparatus according to claim 27, wherein said image processing means has storage means for storing said arbitrary function; means for obtaining a flare component by calculating a convolution of an object image signal $I(x,y)$ indicating an object image, which is obtained from said electronic image pickup device, with said point image energy intensity distribution stored in said storage means; and means for subtracting said flare component from said object image signal.

31. An electronic imaging apparatus according to claim 27, wherein at least a part of said image-forming optical system is changeable, said electronic imaging apparatus further comprising:

means for deriving a difference $\Delta Sk$ between the paraxial image point position of said unwanted order of diffracted light and the paraxial image point position of said working order of diffracted light according to a change in said image-forming optical system.

32. An electronic imaging apparatus according to claim 27, wherein at least a part of said image-forming optical system is changeable, said electronic imaging apparatus further comprising:

storage means for storing as a data string a difference $\Delta Sk$ between the paraxial image point position of said unwanted order of diffracted light and the paraxial image point position of said working order of diffracted light according to a change in said image-forming optical system; and means for reading said data from said storage means.

33. An electronic imaging apparatus according to claim 30, wherein said convolution is performed by dividing an effective imaging surface of said electronic image pickup device into $10^3$ to $10^4$ regions and sampling one pixel from each region.

34. An electronic imaging apparatus according to claim 27, further comprising means for supplying said object image signal to said image processing means in a form of three color component signals, wherein said image processing means executes processing for removing flare components containing light components of unwanted orders of diffraction produced by said diffraction surface with respect to a plurality of color component signals.

35. An electronic imaging apparatus according to claim 23, wherein said object image is divided into a plurality of annular zones according to image height, and wherein said storage means contains for each of said zones a point image energy intensity distribution at a representative image height selected from that zone.

* * * * *